United States Patent [19]

Matsumoto

[11] Patent Number: 5,893,156
[45] Date of Patent: Apr. 6, 1999

[54] LOCK CONTROL APPARATUS AND METHOD INCLUDING CONTROLLING MEANS FOR SETTING A LOCK VARIABLE STATUS

[75] Inventor: Kazuya Matsumoto, Yamanashi, Japan

[73] Assignee: NEC Corporation, Tokyo, Japan

[21] Appl. No.: 630,599

[22] Filed: Apr. 10, 1996

[30] Foreign Application Priority Data

Apr. 14, 1995 [JP] Japan .................................. 7-088916

[51] Int. Cl.$^6$ ............................ G06F 12/00; G06F 13/00
[52] U.S. Cl. ..................... 711/145; 711/118; 711/147; 711/152; 711/154
[58] Field of Search ................. 364/DIG. 1, DIG. 2; 395/474, 471, 451, 479, 481, 472; 711/124, 144, 145, 147, 148, 152, 154, 118, 164

[56] References Cited

U.S. PATENT DOCUMENTS

| 5,129,089 | 7/1992 | Nielsen ................................. 395/451 |
| 5,175,837 | 12/1992 | Arnold et al. .......................... 395/479 |
| 5,210,848 | 5/1993 | Lui ......................................... 395/451 |
| 5,214,766 | 5/1993 | Lui ......................................... 395/451 |
| 5,230,070 | 7/1993 | Lui ......................................... 395/451 |
| 5,237,694 | 8/1993 | Horne et al. ............................ 395/451 |
| 5,265,232 | 11/1993 | Gannon et al. ......................... 395/451 |
| 5,297,269 | 3/1994 | Donaldson et al. .................... 395/471 |
| 5,317,716 | 5/1994 | Lui ......................................... 395/471 |
| 5,408,629 | 4/1995 | Tsuchiva et al. ....................... 395/478 |
| 5,566,319 | 10/1996 | Lenz ....................................... 395/474 |

FOREIGN PATENT DOCUMENTS

58-247670  12/1983  Japan .

*Primary Examiner*—Tod R. Swann
*Assistant Examiner*—Tuan V. Thai
*Attorney, Agent, or Firm*—McGinn & Gibb, P.C.

[57] ABSTRACT

A lock control for each processor is based on a lock variable status set by a lock control apparatus in a secondary cache. The lock control apparatus indexes lock address registers upon receiving one of LOCK, SETLS, and UNLOCK requests. The SETLS request sets the lock variables to a "lock" status in all banks after acquiring a "lock" in one bank. The SETLS request prevents a deadlock in a banked memory system.

18 Claims, 12 Drawing Sheets

| STATUS | LOCAL | OTHER |
|---|---|---|
| LCK | LOCK | UNLOCK |
| ULS | UNLOCK | (UNKNOWN) |

FIG.4

| OTHER | OTHER | ACTION FOR LOCK REQUEST |
|---|---|---|
| LCK (SAME PROC) | X | LOCK SUCCESS |
| LCK (DIFFERENT PROC) | X | LOCK FAIL |
| ULS | LCK | LOCK FAIL |
| ULS | ULS | LOCK SUCCESS<br>BANK A: LOCAL ← LCK |
| ULS | NO ENTRY | LOCK SUCCESS<br>BANK A: LOCAL ← LCK<br>BANK B: LOCAL ← ULS |
| NO ENTRY | LCK | LOCK FAIL, LOCAL ← LOCK ADDRESS<br>BANK A: LOCAL ← ULS<br>BANK B: LOCAL ← ULS |
| NO ENTRY | ULS | LOCK SUCCESS, LOCAL ← LOCK ADDRESS<br>BANK A: LOCAL ← LCK |
| NO ENTRY | NO ENTRY | LOCK SUCCESS, LOCAL ← LOCK ADDRESS<br>BANK A: LOCAL ← LCK<br>BANK B: LOCAL ← ULS |

X: DON'T CARE

FIG.5

| LOCAL | OTHER | ACTION FOR SETLS REQUEST |
|---|---|---|
| LCK | X | (NO ACTION) |
| ULS | LCK | — |
| ULS | ULS | LOCAL ← LCK |
| ULS | NO ENTRY | LOCAL ← LCK |
| NO ENTRY | LCK | — |
| NO ENTRY | ULS | LOCAL ← LOCK ADDRESS<br>LOCAL ← LCK |
| NO ENTRY | NO ENTRY | LOCAL ← LOCK ADDRESS<br>LOCAL ← LCK |

X: DON'T CARE
—: NOT OCCUR

FIG.6

| STATUS | ACTION FOR UNLOCK REQUEST |
|---|---|
| LCK | → ULS |
| ULS OR NO ENTRY | (NO ACTION) |

| STATUS | LOCAL | OTHER |
|---|---|---|
| LCK | LOCK | UNLOCK |
| ULS | UNLOCK | (UNKNOWN) |
| ULE | UNLOCK | UNLOCK |

FIG.9

| LOCAL | OTHER | ACTION FOR LOCK REQUEST |
|---|---|---|
| LCK (SAME PROC) | X | LOCK SUCCESS |
| LCK (DIFFERENT PROC) | X | LOCK FAIL |
| ULS | LCK | LOCK FAIL |
| | ULS OR ULE | LOCK SUCCESS<br>BANK A: LOCAL←LCK, OTHER←ULS<br>BANK B: LOCAL←ULE, OTHER←ULS |
| | NO ENTRY | LOCK SUCCESS<br>BANK A: LOCAL←LCK<br>BANK B: LOCAL←ULE |
| ULE | X | LOCK SUCCESS<br>BANK A: LOCAL←LCK |
| NO ENTRY | LCK | LOCK FAIL, LOCAL←LOCK ADDRESS<br>BANK A: LOCAL←ULS<br>BANK B: LOCAL←ULS |
| | ULS OR ULE | LOCK SUCCESS, LOCAL←LOCK ADDRESS<br>BANK A: LOCAL←LCK, OTHER←ULS<br>BANK B: LOCAL←ULE, OTHER←ULS |
| | NO ENTRY | LOCK SUCCESS, LOCAL←LOCK ADDRESS<br>BANK A: LOCAL←LCK<br>BANK B: LOCAL←ULE |

X: DON'T CARE

FIG. 10

| LOCAL | OTHER | ACTION FOR SETLS REQUEST |
|---|---|---|
| LCK | X | (NO ACTION) |
| ULS | LCK | — |
| | ULS | LOCAL ← LCK |
| | ULE | LOCAL ← LCK, OTHER ← ULS |
| | NO ENTRY | LOCAL ← LCK |
| ULE | X | LOCAL ← LCK |
| NO ENTRY | LCK | — |
| | ULS | LOCAL ← LOCK ADDRESS<br>LOCAL ← LCK |
| | ULE | LOCAL ← LOCK ADDRESS<br>LOCAL ← LCK, OTHER ← ULS |
| | NO ENTRY | LOCAL ← LOCK ADDRESS<br>LOCAL ← LCK |

X : DON'T CARE
— : NOT OCCUR

FIG.11

| STATUS | ACTION FOR UNLOCK REQUEST |
|---|---|
| LCK | → ULE |
| ULS OR NO ENTRY | (NO ACTION) |
| ULE | — |

— : NOT OCCUR

| STATUS | LOCAL | OTHER |
|---|---|---|
| LCK | LOCK | UNLOCK |
| ULS | UNLOCK | (UNKNOWN) |
| ULE | UNLOCK | UNLOCK |
| ULL | UNLOCK | LOCK |

FIG.14

| LOCAL | OTHER | ACTION FOR LOCK REQUEST |
|---|---|---|
| LCK (SAME PROC) | X | LOCK SUCCESS |
| LCK (DIFFERENT PROC) | X | LOCK FAIL |
| ULS | LCK OR ULL | LOCK FAIL<br>BANK A: LOCAL ← ULL<br>BANK B: LOCAL ← ULL |
| | ULS OR ULE | LOCK SUCCESS<br>BANK A: LOCAL ← LCK, OTHER ← ULL<br>BANK B: LOCAL ← ULE, OTHER ← ULS |
| | NO ENTRY | LOCK SUCCESS<br>BANK A: LOCAL ← LCK<br>BANK B: LOCAL ← ULE |
| ULE | X | LOCK SUCCESS<br>BANK A: LOCAL ← LCK |
| ULL | X | LOCK FAIL |
| NO ENTRY | LCK OR ULL | LOCK FAIL, LOCAL ← LOCK ADDRESS<br>BANK A: LOCAL ← ULL<br>BANK B: LOCAL ← ULL |
| | ULS OR ULE | LOCK SUCCESS, LOCAL ← LOCK ADDRESS<br>BANK A: LOCAL ← LCK, OTHER ← ULL<br>BANK B: LOCAL ← ULE, OTHER ← ULS |
| | NO ENTRY | LOCK SUCCESS, LOCAL ← LOCK ADDRESS<br>BANK A: LOCAL ← LCK<br>BANK B: LOCAL ← ULE |

X: DON'T CARE

FIG.15

| LOCAL | OTHER | ACTION FOR SETLS REQUEST |
|---|---|---|
| LCK | X | (NO ACTION) |
| ULS | LCK OR ULL | — |
| ULS | ULE OR ULS | LOCAL ← LCK, OTHER ← ULL |
| ULS | NO ENTRY | LOCAL ← LCK |
| ULE | X | LOCAL ← LCK |
| ULL | X | — |
| NO ENTRY | LCK OR ULL | — |
| NO ENTRY | ULE OR ULS | LOCAL ← LOCK ADDRESS<br>LOCAL ← LCK, OTHER ← ULL |
| NO ENTRY | NO ENTRY | LOCAL ← LOCK ADDRESS<br>LOCAL ← LCK |

X : DON'T CARE
— : NOT OCCUR

FIG.16

| STATUS | ACTION FOR UNLOCK REQUEST |
|---|---|
| LCK | → ULE |
| ULS OR NO ENTRY | (NO ACTION) |
| ULE | — |
| ULL | → ULS |

LOCK CONTROL APPARATUS AND METHOD INCLUDING CONTROLLING MEANS FOR SETTING A LOCK VARIABLE STATUS

BACKGROUND OF THE INVENTION

The present invention relates to a lock control apparatus and method, and more particularly to a lock control apparatus and method for a computer system, which includes a plurality of banks, each paired system of which has a plurality of store-in cache memories (SICs) which share a main memory. Each of the caches of the paired system is used by at least one central processing unit, respectively, and is connected to another cache of the paired system through a bus.

In a shared-memory multi-processor system, a plurality of processors share a main memory. In such a system, a certain processor must exclusively use data in a certain shared area of the main memory for a certain time period. For example, when the processor executes an operation of adding "1" to data in the certain shared area, during a sequence of processing conducted since data in the shared area is read out to add "1" until the data is again written in the shared area, other processors must be prohibited from accessing to that data. Without such prohibition, updating data and thus accessing updated data are not ensured.

In order to ensure exclusive access and thus to prohibit the other processors from accessing the data, a lock variable is typically used. In gaining access to the shared area of the main memory, the lock variable must be checked to confirm that the lock variable is not in a "lock" status. The lock variable check is conducted in accordance with a lock request, and when the lock variable is in an "unlock" status, then the lock variable is updated to the "lock" status. Then, access is permitted to a corresponding shared area. After the exclusive processing is finished, the lock variable is returned to the "unlock" status in accordance with an unlock request. Such control is called a "lock control".

When a cache memory (e.g., a first cache memory) is provided in each processor, if an inconsistency occurs between the contents of the main memory and the contents of the cache memory, corresponding data in the cache memory must be invalidated. Such a processing is called "cache consistency processing".

For example, when a certain processor rewrites the contents in the shared area from "0" to "1", unless corresponding data in the cache memories of other processors is invalidated (e.g., nullified), the other processors unintentionally and erroneously read out old data, that is, "0". Hence, that data is invalidated through the cache consistency processing so as to be "flushed" (e.g., removed) from the cache memory. Then, other processors read data in the main memory because of a cache "miss", since the processors are capable of reading data after updating, that is, a "1".

In this example, when a certain processor A acquires a "lock" in accordance with the lock request, all the cache consistency processing with respect to corresponding shared areas must be completed. Without the processing, a data updating operation which has been conducted with respect to the shared areas by other processors B is not ensured.

Hence, a conventional lock control apparatus has a request buffer which ensures an order of requests. A "reply for lock" (e.g., a lock reply) is stored in a last entry of the request buffer.

In the conventional lock control apparatus, when a lock is to be acquired in the secondary cache which has been divided into a plurality of banks, two conventional methods are used as described below.

In a first method, a processor issues lock requests to all banks concurrently until the processor acquires locks from all the banks. However, in this first method, when a plurality of processors issue a lock request to the same lock address, respectively, and when a different processor obtains a lock in each bank, an unlock request and a lock request must be repeated since each central processing unit releases the lock thus acquired once until it issues a lock request again and the lock succeeds in all the banks. This is cumbersome and problematic in that the time required for acquiring a lock at the time of lock conflict at the same address is increased.

In a second method, a processor issues a lock request to a certain bank. After acquisition of the lock, the processor issues cache consistency requests to all the banks. However, in this second method, a cache memory in the processor cannot be accessed until a reply to the cache consistency request is returned from all the banks.

That is, even though a result of a lock request is found in accordance with a lock reply from a certain secondary cache, because it cannot be ensured that the cache consistency processing for the shared area has been completed, a first cache cannot be accessed until a reply to a request for a cache consistency guarantee is returned from all the secondary caches. Hence, access to the shared area is delayed until replies to the request for the cache consistency guarantee are returned from all the banks of the secondary cache although the lock acquisition has been completed.

SUMMARY OF THE INVENTION

In view of the foregoing problem of the conventional system, an object of the present invention is to reduce the time required for accessing a shared area via a lock acquisition.

In a lock control apparatus and method according to a first aspect of the present invention, a lock status register stores a lock variable status with respect to each processor and to each memory bank, and the controller controls the lock variable status stored in the lock status register. If the lock variable status with respect to a certain memory bank indicates a lock acquisition status, the controller sets the lock variable status in other memory banks to the lock acquisition status.

With the unique and unobvious structure and method of the present invention, the time required for accessing a shared area is reduced as compared to the conventional systems described above.

BRIEF DESCRIPTION OF THE DRAWINGS

The above-mentioned and other objects, features and advantages of the present invention will become more apparent by reference to the following detailed description of the invention taken in conjunction with the accompanying drawings in which.

DETAILED DESCRIPTION OF THE PREFERRED EMBODIMENTS

A lock control apparatus and method in accordance with preferred embodiments of the present invention will be described in detail with reference to the accompanying drawings.

Figure 1:
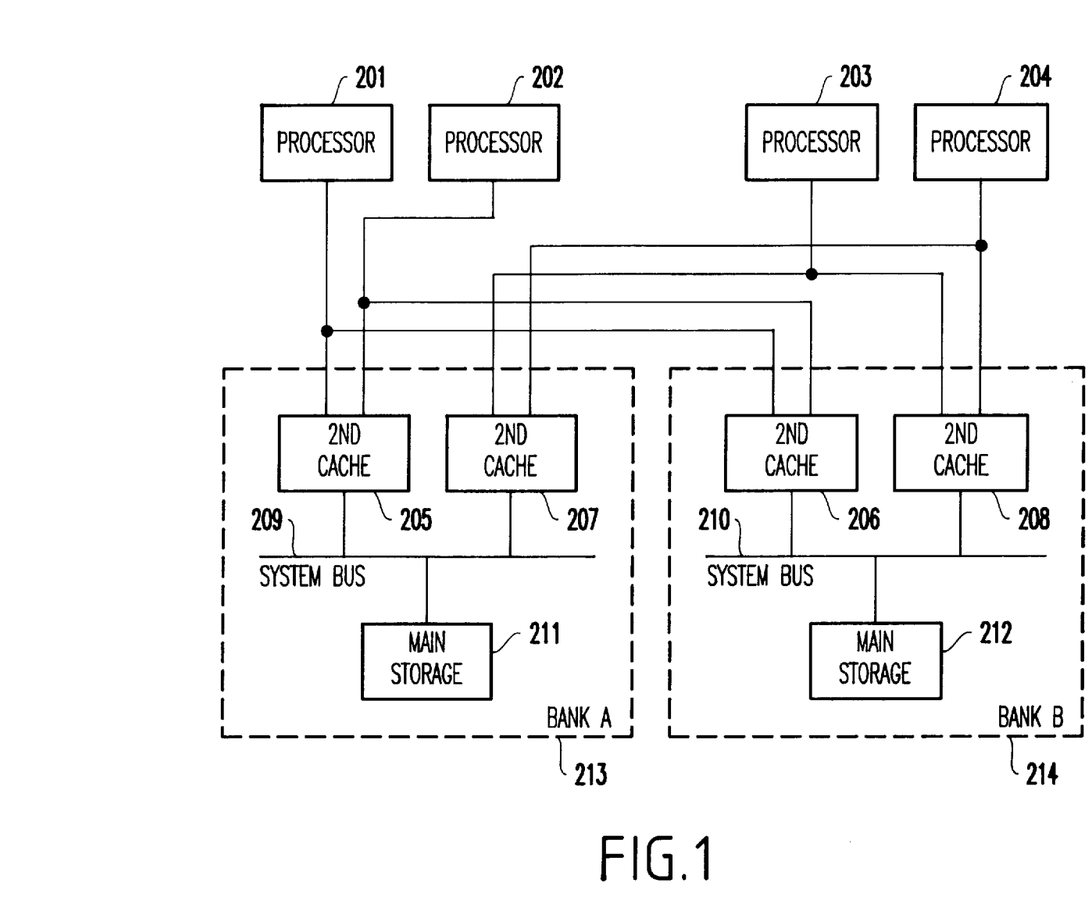
FIG. 1 is a block diagram showing a computer system to which the present invention is applied.

Referring to FIG. 1, a multi-processor system includes four processors 201 to 204, four secondary caches 205 to 208, and two main storages 211 and 212. Each processor 201 to 204 has a first cache therein. The processors 201 and 202 share the secondary caches 205 and 206, and the processors 203 and 204 share the secondary caches 207 and 208. The main storages 211 and 212 are divided into a plurality of banks (e.g., two) including banks A (213) and B (214).

Corresponding to the main storages 211 and 212, the secondary caches 205 and 206 are divided into the two banks, and the secondary caches 207 and 208 also are divided into the two banks. The secondary caches 205 and 207 are connected to the main storage 211 via a system bus 209, and the secondary caches 206 and 208 are connected to the main storage 212 via a system bus 210.

A bank of the two banks to be accessed, is determined according to a certain bit in a request address from the processors 201 to 204. Accordingly, when an address outputted from the processors 201 to 204 represents (e.g., corresponds to) bank A, the processors 201 and 202 access the main storage 211 through the secondary cache 205, while the processors 203 and 204 access the main storage 211 through the secondary cache 207.

Similarly, when an address outputted from the processors 201 to 204 represents (e.g., corresponds to) the bank B, the processors 201 and 202 access the main storage 212 through the secondary cache 206, while the processors 203 and 204 access the main storage 212 through the secondary cache 208.

The secondary caches 205 to 208 operate in accordance with a store-in protocol. In the store-in protocol, data written to the secondary cache (e.g., caches 205 through 208) is not written to the main storage (e.g., main storages 211 and 212) until a certain timing.

Further, each of the secondary caches 205 to 208 reads information in the other secondary cache coupled to its same (e.g., common) bus, through the respective system buses 209 and 210.

Figure 2:
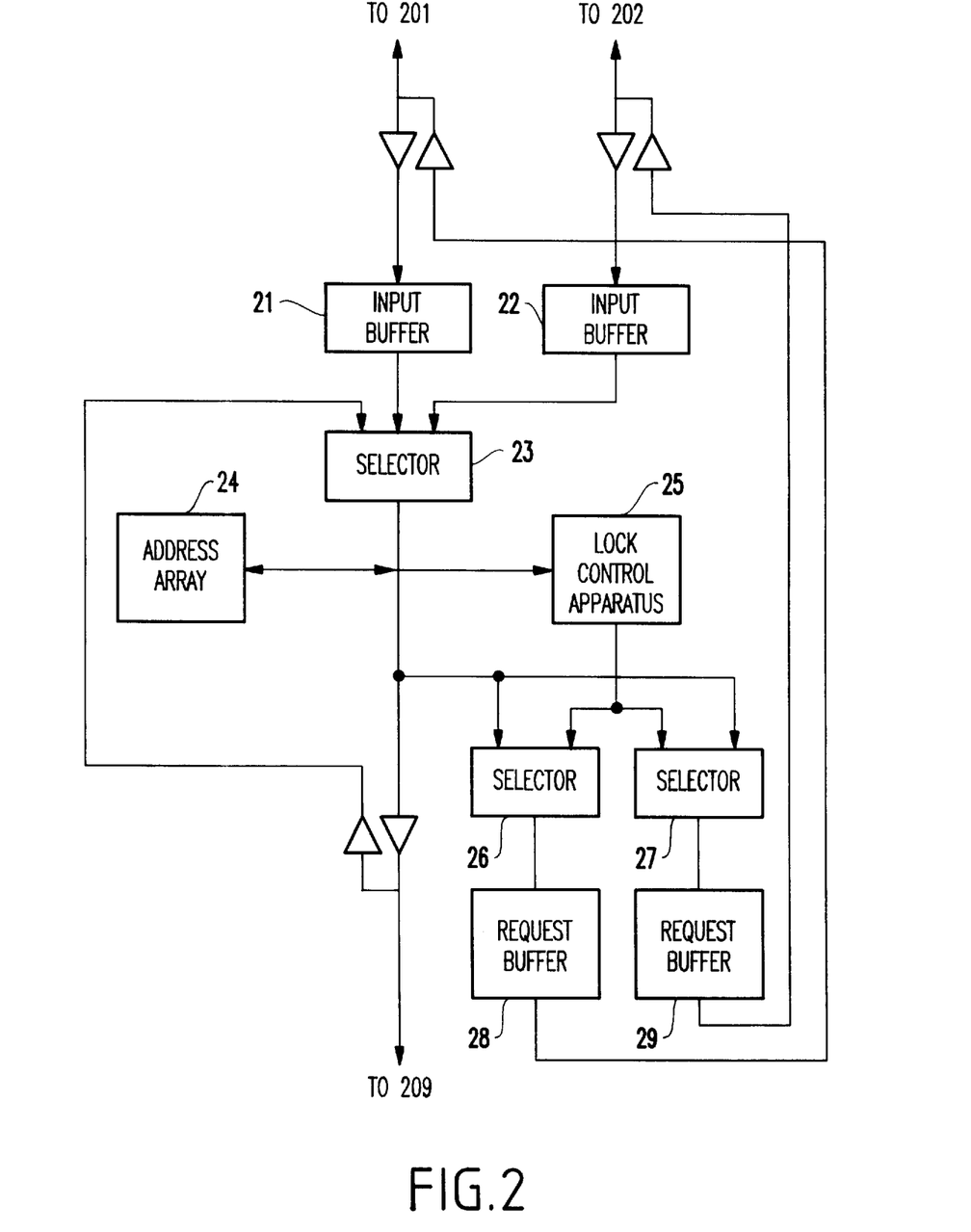
FIG. 2 is a block diagram showing a secondary cache 205 according to an embodiment of the present invention.

Referring to FIG. 2, the secondary cache 205 includes two input buffers 21 and 22 for receiving requests from the processors 201 and 202 via, for example, respective driving circuits (unreferenced) or directly therefrom, a selector 23 for selecting one of the requests from the input buffers 21 and 22 and from the system bus 209 via, for example, respective driving circuits (unreferenced) or directly therefrom, an address array 24 of the secondary cache, a lock control apparatus 25, two selectors 26 and 27 for selecting one of the requests from the lock control apparatus 25 and the selector 23, and two request buffers 28 and 29 for buffering requests from the selectors 26 and 27, respectively, in a "first-in first-out" (FIFO) manner.

According to a predetermined rule, the selector 23 selects one request of the three requests presented. For example, a "round-robin" scheme, in which requests are selected in rotation, may be employed.

The address array 24 comprises an array the same as that of the conventional cache memory, since the address array 24 stores tag addresses corresponding to each entry of a data memory (not shown).

The selectors 26 and 27 select an output of the lock control apparatus 25 when returning a reply for a lock request, and select an output of the selector 23 during the cache consistency control.

The secondary caches 206, 207, and 208 preferably have the same structure as the secondary cache 205 described above.

Figure 3:
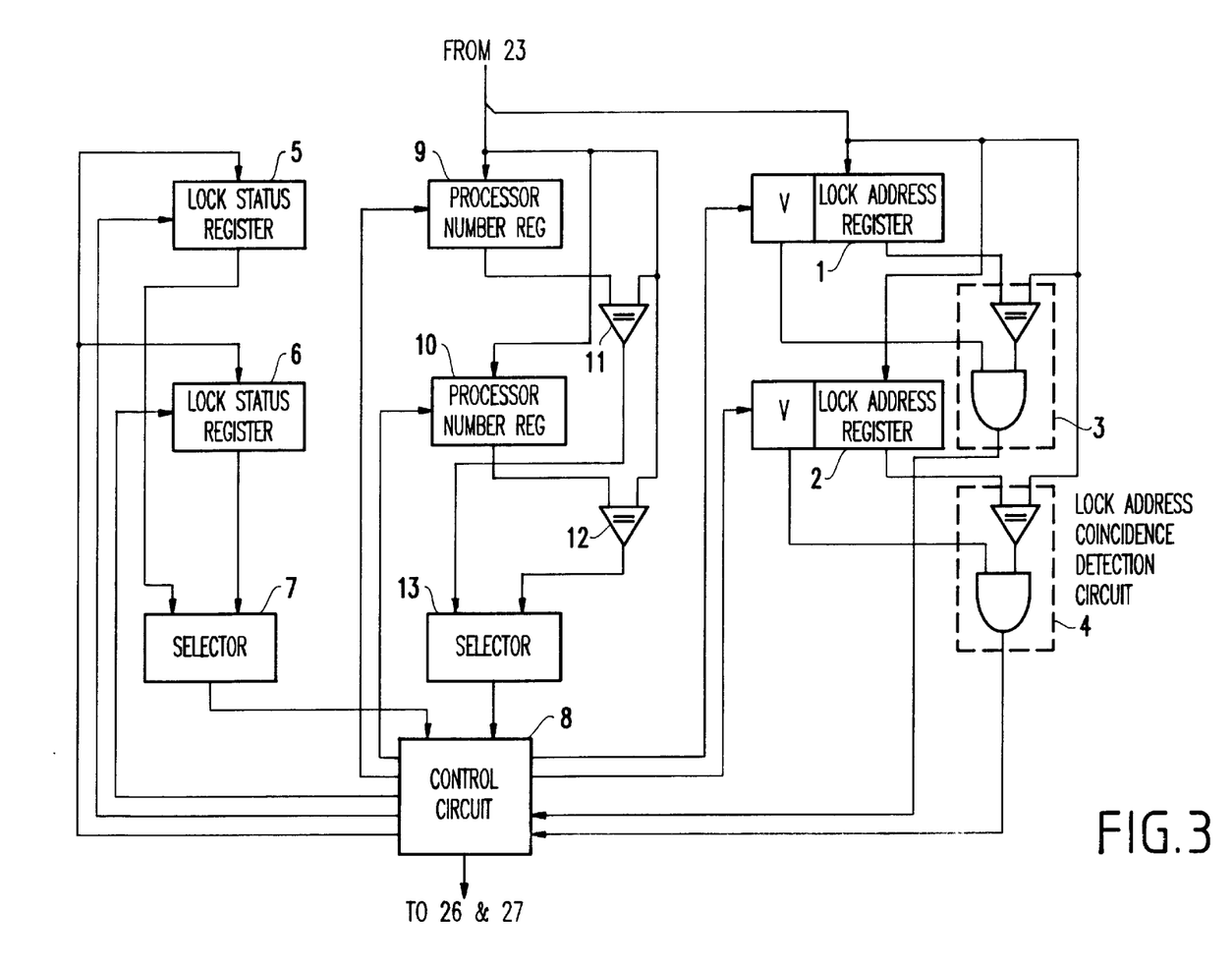
FIG. 3 is a block diagram showing a lock control apparatus 25 according to the embodiment of the present invention.

Referring to FIG. 3, the lock control apparatus 25 includes lock address registers 1 and 2 for storing an address of a lock variable with respect to a request selected by the selector 23. Lock status registers 5 and 6 store a status of the lock variable in the lock address registers 1 and 2, and lock address coincidence detection circuits 3 and 4 (each including, for example, a comparator and an AND gate, both of which are unreferenced) detect a coincidence between the address from the selector 23 and addresses stored in the lock address registers 1 and 2. A selector 7 selects one of the lock status stored in the lock status registers 5 and 6 according to the result of the lock address coincidence detection circuits 3 and 4. The lock address registers 1 and 2 each have a valid bit which indicates that the respective lock address register stores valid data.

The lock control apparatus 25 further includes processor number registers 9 and 10 for storing a specified number of each of the processors which issue a lock request, comparators 11 and 12 for detecting coincidence between the processor number outputted from the selector 23 and processor numbers stored in the processor number registers 9 and 10, a selector 13 for selecting one of the outputs of the comparators 11 and 12, and a control circuit 8 for controlling the lock address registers 1 and 2, the lock status registers 5 and 6, and the processor number registers 9 and 10.

Hereinbelow and referring to FIGS. 4–8, the operation of the lock control apparatus in accordance with the abovementioned embodiment of the present invention will be described. In the description below, a secondary cache connected to a processor which issued a request, is called a "local cache".

The lock status is modified by one of a LOCK request, a SETLS request, and an UNLOCK request as described below.

The LOCK request checks whether other processors have acquired a lock, and if none of the processors has acquired a lock, then the lock status is modified to the "lock" status. The SETLS request modifies the lock status of a bank, which has not been modified to the "lock" status in accordance with the LOCK request, to the "lock" status. The UNLOCK request updates the lock status of a bank, which has been modified to the "lock" status in accordance with the LOCK request or the SETLS request, to the "unlock" status.

Figure 4:
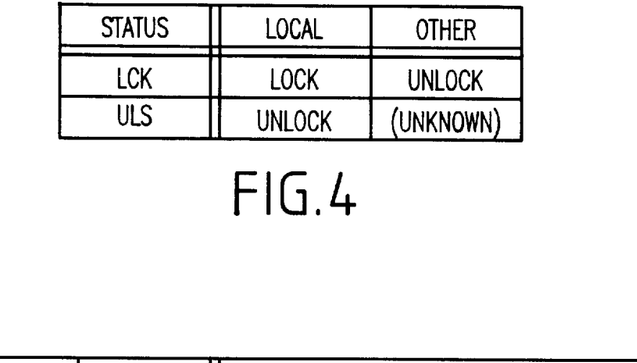
FIG. 4 is a diagram showing types of status of a lock variable in accordance with a first embodiment of the present invention.

Referring to FIG. 4, the lock variable has a status of a "LCK" and a "ULS". The "LCK" indicates that a lock status of a processor connected to a selected secondary cache is the "lock" status, and that a lock status of other processors is the "unlock" status. The "ULS" indicates that a lock status of a processor connected to this secondary cache is the "unlock" status, and it is uncertain or unknown whether other processors have acquired locks.

Figure 5:
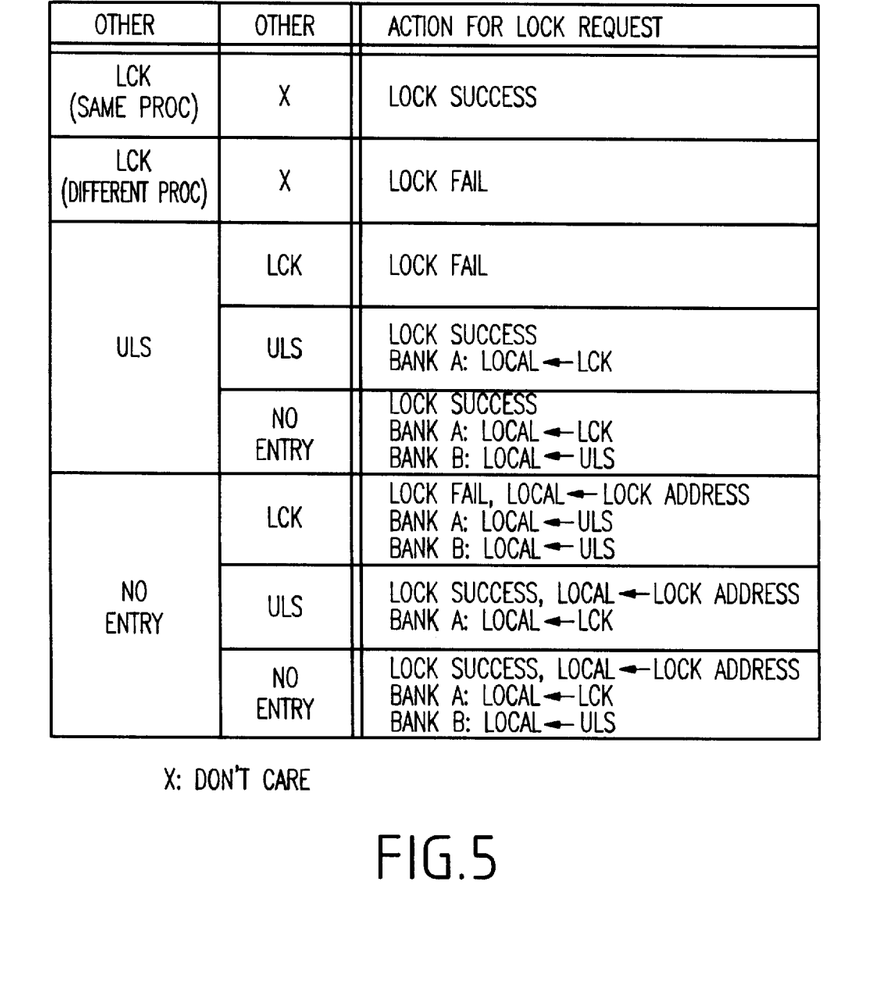
FIG. 5 is a diagram showing operations for a LOCK request in accordance with the first embodiment of the present invention.

Referring to FIG. 5, the leftmost column shows a lock status of the local cache, the center column shows a lock status of caches other than the local cache, and the rightmost column shows action taken for a LOCK request.

FIG. 5 is applied to both bank A and bank B simultaneously, because a processor issues LOCK requests to both banks. However, those banks A and B operate differently for modifying the lock variable status under the LOCK request. A row of "BANK A:" in FIG. 5 is applied only if an applied bank is bank A, and a row of "BANK B:" is applied only if an applied bank is bank B.

FIG. 5 is based on the premise that bank A is locked by a LOCK request. However, the locked bank may be bank B, or any bank determined by an address.

According to FIG. 5, when a lock variable status of the local cache is "LCK" and a processor number is different, the lock control apparatus returns a "lock fail" signal, since another processor has already acquired a lock.

When a lock variable status of the local cache is "ULS" and a lock status of caches other than the local cache is "ULS", the lock control apparatus returns "lock success", since no processors have acquired a lock.

Moreover, if the local cache is bank A, a lock variable status of the local cache becomes "LCK", and a lock variable status of caches other than the local cache remains "ULS". If the local cache is bank B, lock variable statuses of all the caches remain "ULSI".

When a lock variable of a corresponding address is not registered in the local cache, the lock control apparatus operates almost the same as above. The only exceptions are that the lock control apparatus in the local cache (FIG. 3) registers a lock address to one of the lock address registers 1 and 2, validates a corresponding valid bit, and registers a processor number (e.g., a number of the processor issuing the lock request) to one of the corresponding processor number registers 9 and 10.

Figure 6:
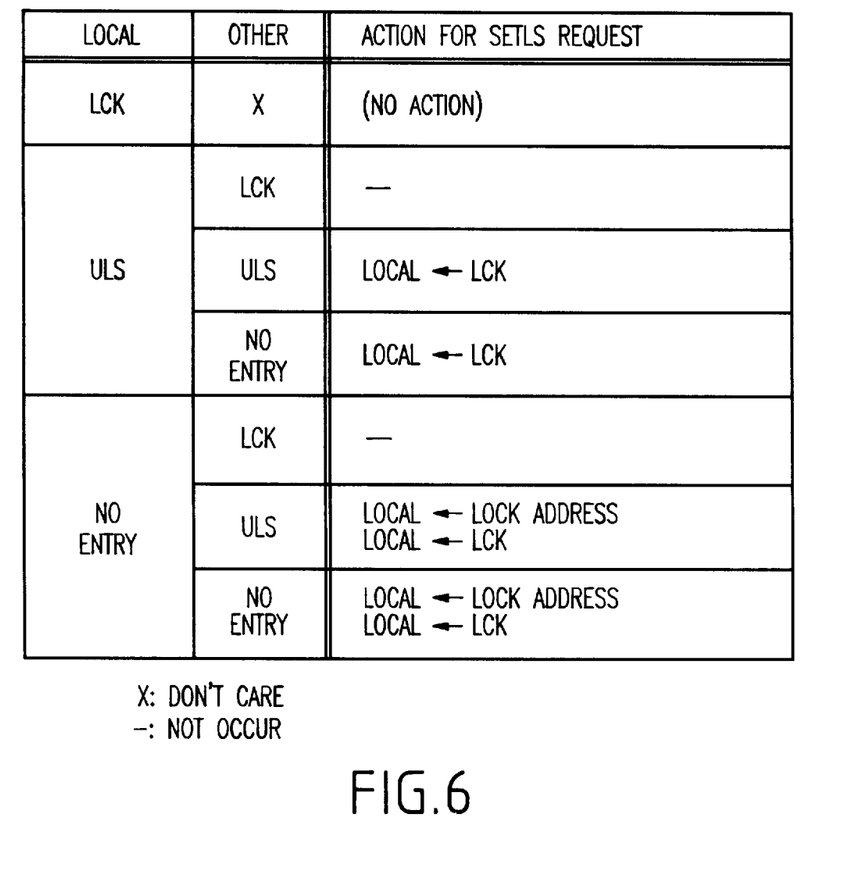
FIG. 6 is a diagram showing operations for a SETLS request in accordance with the first embodiment of the present invention.

Referring to FIG. 6, the leftmost column shows a lock status of the local cache, the center column shows a lock status of caches other than the local cache, and the rightmost column shows action taken for a SETLS request.

According to FIG. 6, when a lock variable status of the local cache is "ULS" and a lock status of caches other than the local cache is "ULS", a lock variable status of the local cache becomes "LCK", and a lock variable status of caches other than the local cache remains "ULS".

Figure 7:
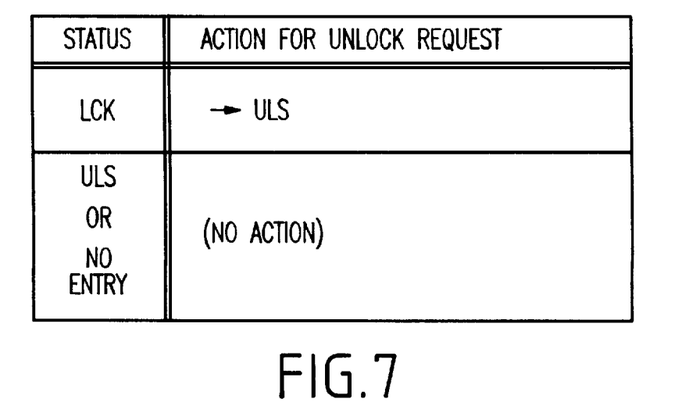
FIG. 7 is a diagram showing operations for an UNLOCK request in accordance with the first embodiment of the present invention.

Referring to FIG. 7, the left column shows a lock status of the local cache, and the right column shows action taken for an UNLOCK request.

According to FIG. 7, when a lock variable status of the local cache is "LCK", a lock variable status of the local cache becomes "ULS". If the lock variable status of the local cache is "ULS", or no entry, then no action is taken for the UNLOCK request because no lock to be "unlocked" exists.

Figure 8:
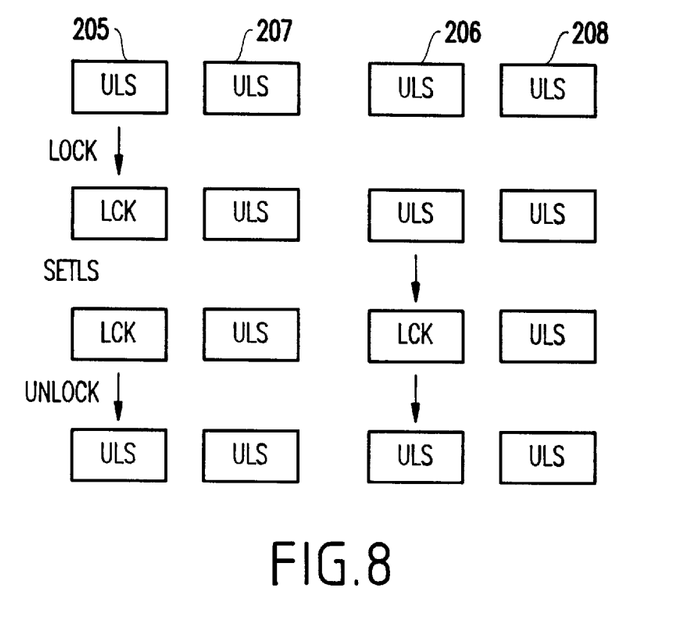
FIG. 8 is a diagram showing exemplary operations in accordance with the first embodiment of the present invention.

Referring to FIG. 8, the operation of the lock control apparatus according to the first embodiment is described below.

First, assuming that all lock variable statuses are "ULS", when the processor 201 issues a LOCK request, the lock control apparatus returns a "lock success" signal. By this LOCK request, the lock variable status of the secondary cache 205 is modified to "LCK" (FIG. 5).

Next, when the processor 201 issues a SETLS request, the lock variable status of the secondary cache 206 is modified to "LCK" (FIG. 6). Then, the processor 201 can access a shared area in the main storage 211. After the access, when the processor 201 issues an UNLOCK request, the lock variable statuses of the secondary caches 205 and 206 are modified to "ULS" (FIG. 7).

As is apparent from the above description, according to the first embodiment of the present invention, since the lock variable statuses of the secondary caches in all the banks are set to "LCK" by the SETLS request, the time required for accessing a shared area is reduced.

Hereinbelow and referring to FIGS. 9–13, the operation of the lock control apparatus in accordance with the second embodiment of the present invention will be described. The second embodiment is similar to the first embodiment but further includes a "ULE" status for the lock variable.

Figure 9:
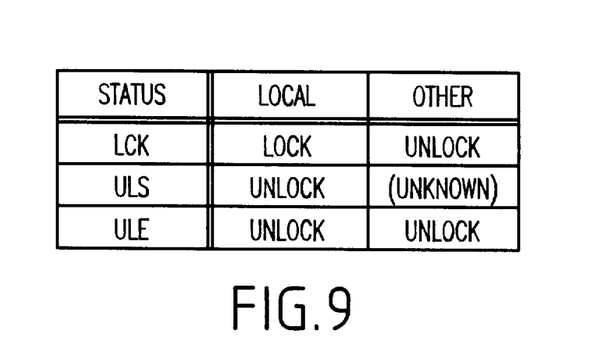
FIG. 9 is a diagram showing types of status of a lock variable in accordance with a second embodiment of the present invention.

Referring to FIG. 9, the lock variable has a status of "LCK", "ULS" or "ULE".

The "ULE" indicates that a lock status of a processor connected to this secondary cache is the "unlock" status, and a lock status of other processors is also the "unlock" status.

Figure 10:
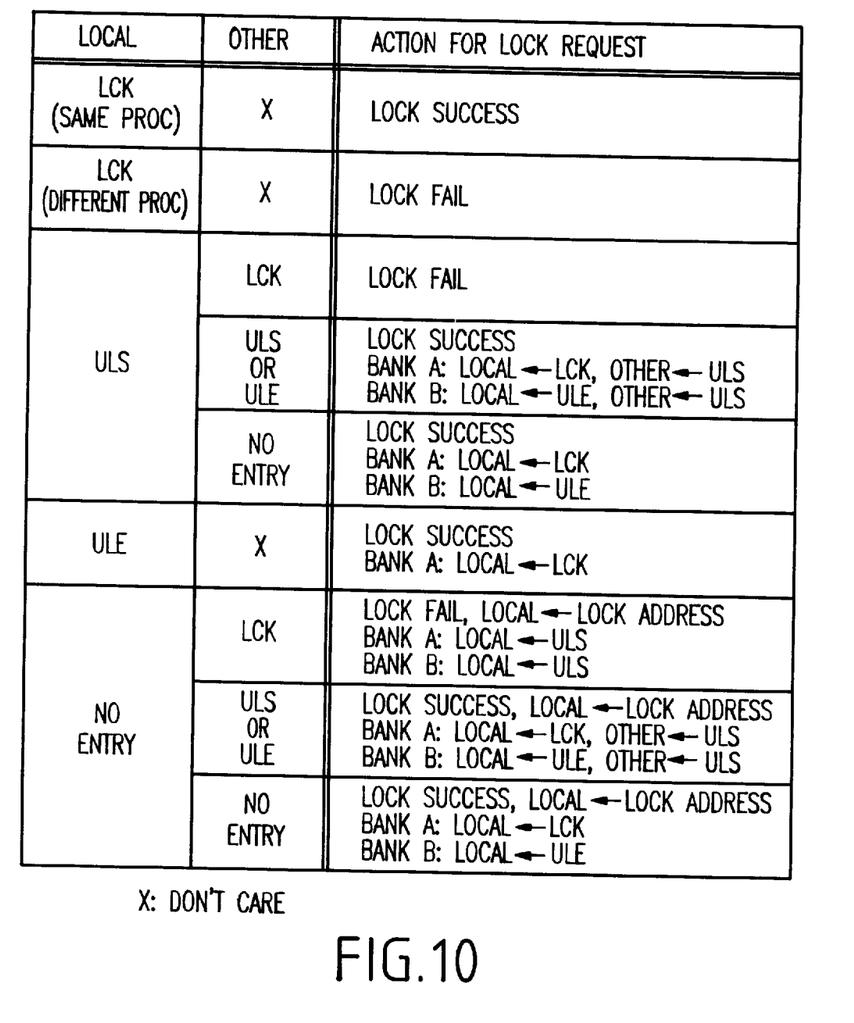
FIG. 10 is a diagram showing operations for a LOCK request in accordance with the second embodiment of the present invention.

Referring to FIG. 10, similarly to FIG. 5, the leftmost column shows a lock status of the local cache, the center column shows a lock status of caches other than the local cache, and the rightmost column shows the action taken for a LOCK request.

According to FIG. 10, when a lock variable status of the local cache is "ULE", the lock control apparatus returns a "lock success" signal without checking other secondary caches.

Figure 11:
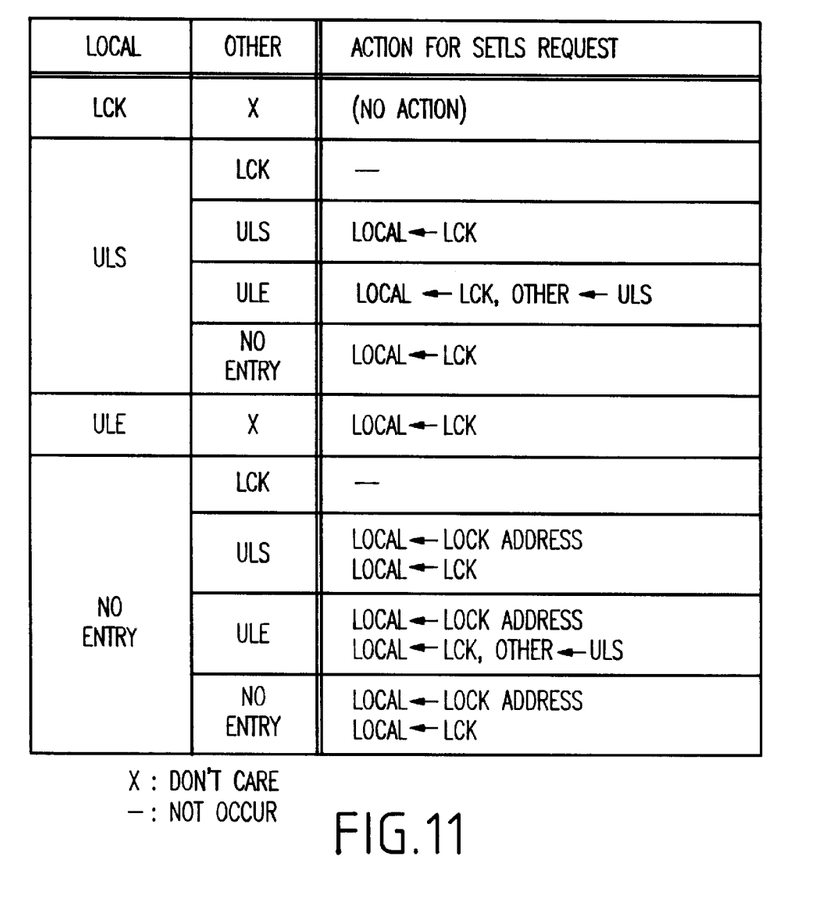
FIG. 11 is a diagram showing operations for a SETLS request in accordance with the second embodiment of the present invention.

Referring to FIG. 11, similarly to FIG. 6, the leftmost column shows a lock status of the local cache, the center column shows a lock status of caches other than the local cache, and the rightmost column shows the action taken for a SETLS request.

According to FIG. 11, when a lock variable status of the local cache is "ULE", a lock variable status of the local cache becomes "LCK" without checking other secondary caches.

Figure 12:
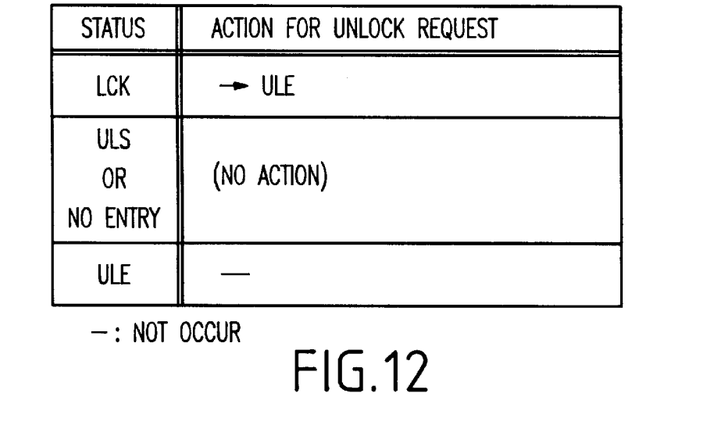
FIG. 12 is a diagram showing operations for an UNLOCK request in accordance with the second embodiment of the present invention.

Referring to FIG. 12, similarly to FIG. 7, the left column shows a lock status of the local cache, and the right column shows the action taken for an UNLOCK request.

According to FIG. 12, when a lock variable status of the local cache is "LCK", a lock variable status of the local cache becomes "ULE" upon issuance of an UNLOCK request, not "ULS" as in the first embodiment (e.g., FIG. 7).

Figure 13:
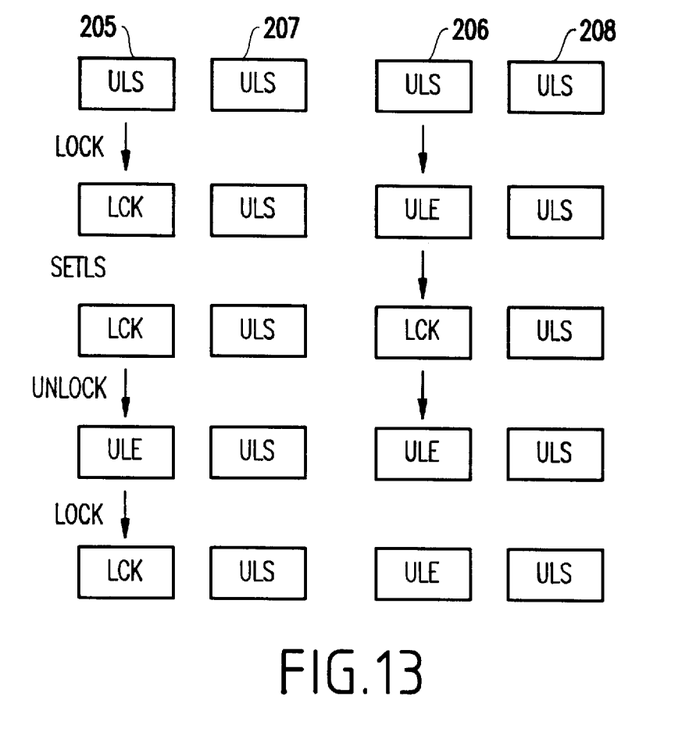
FIG. 13 is a diagram showing exemplary operations in accordance with the second embodiment of the present invention.

Referring to FIG. 13, the lock control apparatus according to the second embodiment is described below.

First, assuming that all lock variable statuses are "ULS", when the processor 201 issues a LOCK request, the lock control apparatus returns a "lock success" signal. By this LOCK request, the lock variable status of the secondary cache 205 is modified to "LCK", and the lock variable status of the secondary cache 206 is modified to "ULE" (FIG. 10).

Next, when the processor 201 issues a SETLS request, the lock variable status of the secondary cache 206 is modified to "LCK" without checking the lock variable status of the secondary cache 208 (FIG. 11). Then, the processor 201 can access a shared area in the main storage 211.

After the access, when the processor 201 issues an UNLOCK request, the lock variable statuses of the secondary caches 205 and 206 are modified to "ULE" (FIG. 12). Thereafter, when the processor 201 issues a next LOCK request, the lock control apparatus returns a "lock success" signal without checking the lock variable status of the secondary caches 207 and 208 (FIG. 10).

As is apparent from the above description, according to the second embodiment of the present invention, since the lock variable status of "ULE" ensures that other processors do not acquire any locks, the time required for accessing a shared area is reduced even more than that in the first embodiment of the present invention.

Hereinbelow and referring to FIGS. 14–18, the operation of the lock control apparatus in accordance with the third embodiment of the present invention will be described. The third embodiment of the present invention is similar to the second embodiment, but further includes a lock variable status of "ULL".

Figure 14:
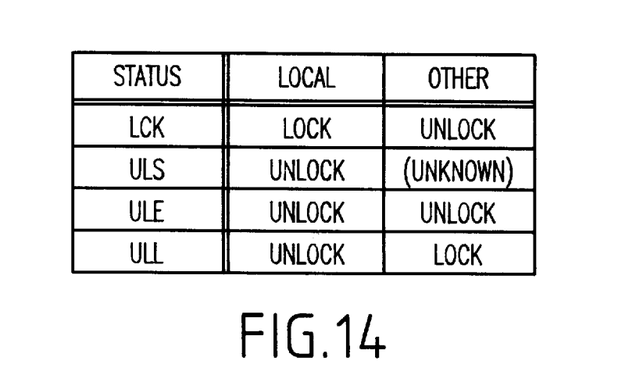
FIG. 14 is a diagram showing types of status of a lock variable in accordance with a third embodiment of the present invention.

Referring to FIG. 14, the lock variable has a status of "LCK", "ULS", "ULE" or "ULL". The "ULL" indicates that a lock status of a processor connected to the secondary cache is the "unlock" status, and a lock status of another processor is the "lock" status.

Figure 15:
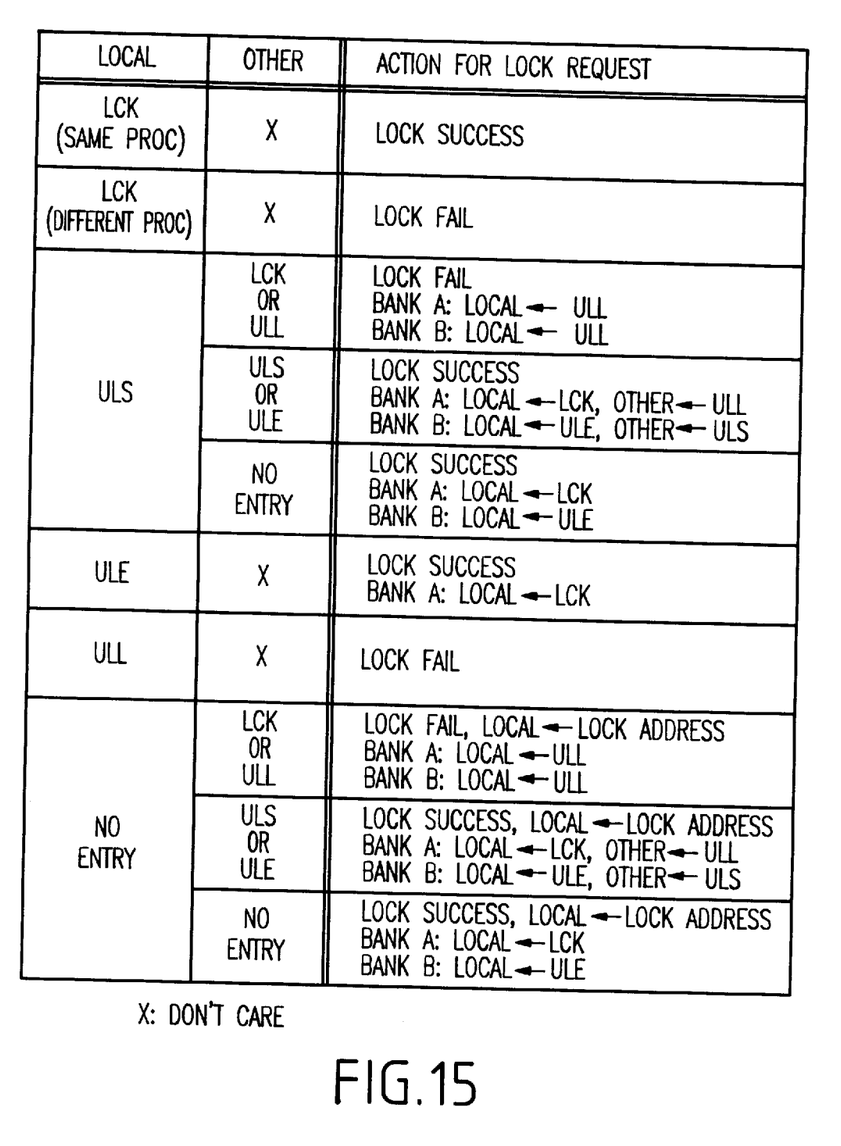
FIG. 15 is a diagram showing operations for a LOCK request in accordance with the third embodiment of the present invention.

Referring to FIG. 15, similarly to FIG. 5, the leftmost column shows a lock status of the local cache, the center column shows a lock status of caches other than the local cache, and the rightmost column shows the action taken for a LOCK request.

According to FIG. 15, when a lock variable status of the local cache is "ULL", the lock control apparatus returns a "lock fail" signal without checking other secondary caches.

Figure 16:
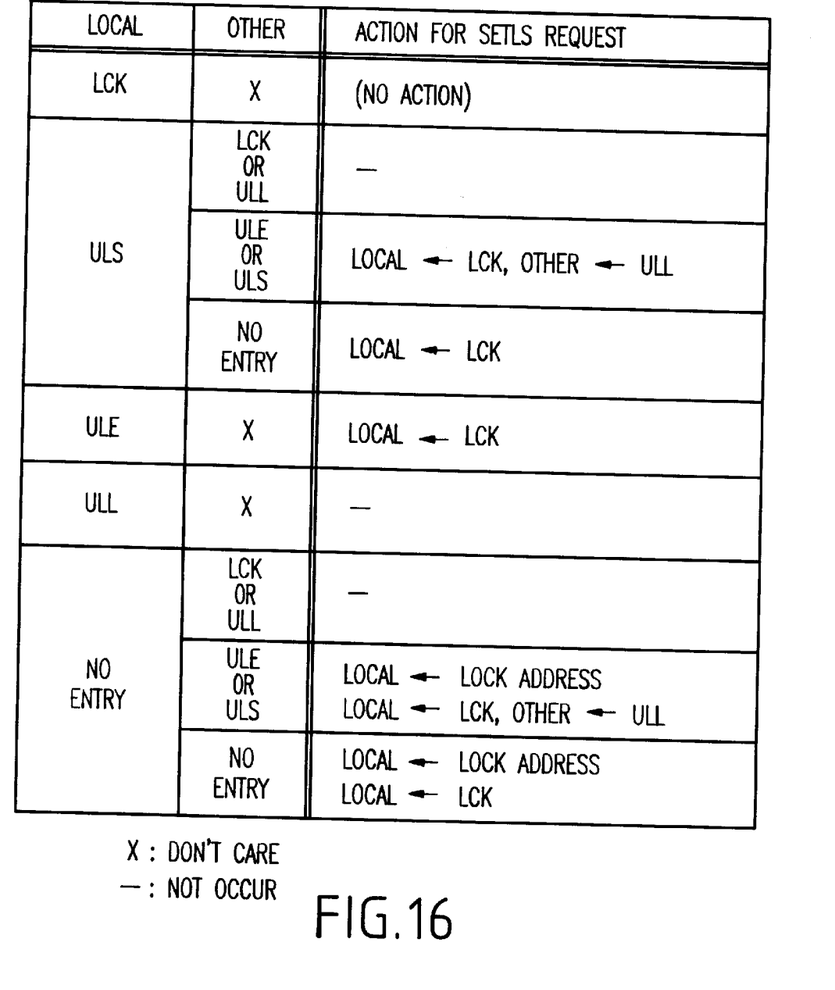
FIG. 16 is a diagram showing operations for a SETLS request in accordance with the third embodiment of the present invention.

Referring to FIG. 16, similarly to FIG. 6, the leftmost column shows a lock status of the local cache, the center column shows a lock status of caches other than the local cache, and the rightmost column shows the action taken for a SETLS request.

According to FIG. 16, when a lock variable status of the local cache is "ULL", the SETLS request is not issued because "ULL" means that another processor has acquired a lock.

Figure 17:
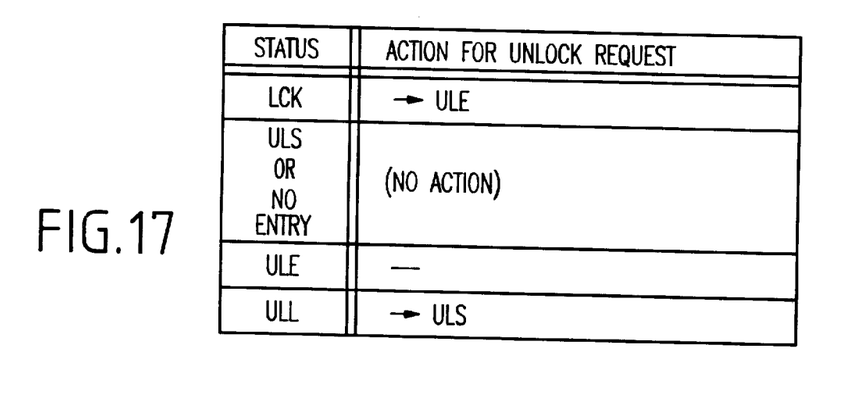
FIG. 17 is a diagram showing operations for an UNLOCK request in accordance with the third embodiment of the present invention.

Referring to FIG. 17, similarly to FIG. 7, the left column shows a lock status of the local cache, and the right column shows action taken for an UNLOCK request.

According to FIG. 17, when a lock variable status of a cache other than the local cache is "ULL", a lock variable status of a cache other than the local cache becomes "ULS" because a lock variable status of the local cache is modified to "ULE" from "LCK".

Figure 18:
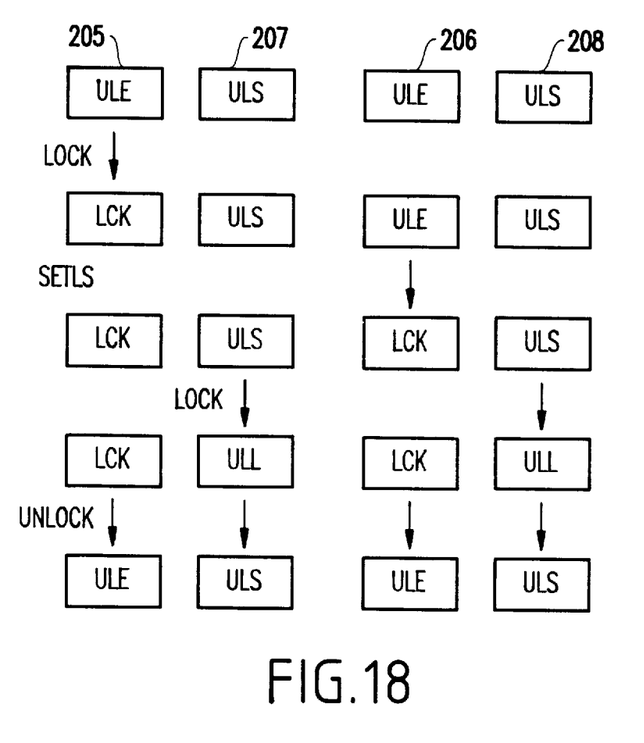
FIG. 18 is a diagram showing exemplary operations in accordance with the third embodiment of the present invention.

Referring to FIG. 18, operation of the lock control apparatus according to the third embodiment is described below.

First, assuming that the lock variable statuses of the secondary cache 205, 206, 207, and 208 are "ULE", "ULE", "ULS", and "ULS", respectively, when the processor 201 issues a LOCK request, the lock control apparatus returns a "lock success" signal without checking the lock variable status of the secondary caches 207 and 208 (FIG. 15). By this LOCK request, the lock variable status of the secondary cache 205 is modified to "LCK" (FIG. 15).

Next, when the processor 201 issues a SETLS request, the lock variable status of the secondary cache 206 is modified to "LCK" without checking the lock variable status of the secondary cache 208 (FIG. 16). Then, the processor 201 can access a shared area in the main storage 211.

In this state, when the processor 203 issues a LOCK request, the lock control apparatus returns a "lock fail" signal (FIG. 15). By this LOCK request, the lock variable statuses of the secondary caches 207 and 208 are modified to "ULL" (FIG. 15). Thereafter, when the processors 203 and 204 issue a LOCK request, the lock control apparatus returns a "lock fail", signal without checking other secondary caches (FIG. 15).

When the processor 201 issues an UNLOCK request, the lock variable statuses of the secondary caches 205 and 206 are modified to "ULE", and the lock variable statuses of the secondary caches 207 and 208 are modified to "ULS" (FIG. 17).

As is apparent from the above description, according to the third embodiment of the present invention, since the lock variable status of "ULL" ensures that another processor acquires a lock, the time required for accessing a shared area is reduced even more than in the second embodiment of the present invention.

While the invention has been described in terms of several preferred embodiments, those skilled in the art will recognize that the invention can be practiced with modification within the spirit and scope of the appended claims.

What is claimed is:

1. A lock control apparatus in a shared-memory multi-processor system including a plurality of processors and a plurality of memory banks, each of said plurality of memory banks including a plurality of cache memories, said lock control apparatus comprising:

means for storing a lock variable status with respect to each processor and each memory bank of said multi-processor system; and means for controlling said lock variable status stored in said storing means, wherein when said lock variable status with respect to a memory bank indicates a lock acquisition status, said controlling means sets said lock variable status in all other of said plurality of memory banks to the lock acquisition status, such that a data in said memory bank is not accessible by processors of said plurality of processors other than said processor accessing said memory bank at a time of said memory bank acquiring said lock acquisition status, wherein said lock variable status includes:
- a first status for indicating that a cache memory associated with the lock control apparatus has acquired a lock and other cache memories of said plurality of cache memories have not acquired a lock; and
- a second status for indicating that said cache memory associated with the lock control apparatus has not acquired said lock and that it is uncertain whether said other cache memories of said plurality of cache memories have acquired said lock.

2. The lock control apparatus according to claim 1, further comprising:
means for judging whether said lock variable status stored in said storing means, with respect to said memory bank, indicates the lock acquisition status.

3. The lock control apparatus according to claim 2, wherein said lock variable status further includes a third status for indicating that none of said plurality of cache memories has acquired said lock.

4. The lock control apparatus according to claim 3, wherein said lock variable status further includes a fourth status for indicating that said cache memory associated with the lock control apparatus has not acquired said lock and that one of said other cache memories of said plurality of cache memories has acquired said lock.

5. A lock control apparatus in a shared-memory multi-processor system having a plurality of cache memories, said lock control apparatus provided corresponding to each cache memory which is connected between a processor and a shared memory, said lock control apparatus comprising:
- a lock status register for storing a status of a lock variable;
- a lock address register for storing an address of the lock variable;
- a judging circuit for judging whether said status stored in said lock status register indicates a lock acquisition status; and
- a controller for controlling said status, wherein when said judging circuit judges that said status in a memory bank indicates the lock acquisition status, said controller sets said status in others of a plurality of memory banks to the lock acquisition status, such that a data in said memory bank is not accessible by processors of said multi-processor system other than a processor accessing said data in said memory bank at a time said memory bank acquires the lock acquisition status, wherein said lock variable status includes:
- a first status for indicating that a cache memory associated with the lock control apparatus has acquired a lock and other cache memories of said plurality of cache memories have not acquired a lock; and
- a second status for indicating that said cache memory associated with the lock control apparatus has not acquired said lock and that it is uncertain whether said other cache memories of said plurality of cache memories have acquired said lock.

6. The lock control apparatus according to claim 5, further comprising:
- a processor number register for storing a number of a processor which issued a lock request corresponding to said status of said lock variable; and
- a comparator for comparing the processor number stored in said processor number register and a number of a processor which issues said lock request.

7. The lock control apparatus according to claim 6, wherein said controller returns lock success information when said lock status register stores the first status and said comparator detects coincidence between the processor number stored in said processor number register and a number of said processor which issues said lock request, and
wherein said controller returns lock fail information when said lock status register stores the first status and said comparator does not detect coincidence between the processor number stored in said processor number register and said number of said processor which issues said lock request.

8. The lock control apparatus according to claim 6, wherein said lock variable status further includes a third status for indicating that none of said plurality of cache memories has acquired said lock.

9. The lock control apparatus according to claim 8, wherein said controller sets the third status to the first status without checking a status in a cache memory associated with another lock control apparatus when the processor issues said lock request.

10. The lock control apparatus according to claim 8, wherein said lock variable status further includes a fourth status for indicating that said cache memory associated with the lock control apparatus has not acquired said lock and that one of said other cache memories of said plurality of cache memories has acquired said lock.

11. The lock control apparatus according to claim 10, wherein said controller sets the second status to the fourth status when the processor issues said lock request.

12. The lock control apparatus according to claim 10, wherein said controller returns lock fail information without checking a status in a cache memory associated with another lock control apparatus when the processor issues said lock request.

13. A multi-processor system comprising:
- a plurality of processors;
- a main storage divided into banks; and
- a plurality of cache memories provided corresponding to a group of said processors and each of said banks, wherein said each of said cache memories includes a lock control apparatus, said lock control apparatus comprising:
  - a lock status register for storing a status of a lock variable;
  - a lock address register for storing an address of the lock variable;
  - a judging circuit for judging whether said status stored in said lock status register indicates a lock acquisition status; and
  - a controller for controlling said status, wherein when said judging circuit judges that said status in a bank indicates the lock acquisition status, said controller sets said status in other banks to the lock acquisition status, such that a data in said bank is not accessible by processors of said multi-processor system other than a processor accessing said data in said bank at a time said bank acquires the lock acquisition status, wherein said lock variable status includes:
- a first status for indicating that a cache memory associated with the lock control apparatus has acquired a lock and other cache memories of said plurality of cache memories have not acquired a lock; and
- a second status for indicating that said cache memory associated with the lock control apparatus has not acquired said lock and that it is uncertain whether said other cache memories of said plurality of cache memories have acquired said lock.

14. The multi-processor system according to claim 13, wherein said lock variable status further includes a third status for indicating that none of said plurality of cache memories has acquired said lock.

15. The multi-processor system according to claim 14, wherein said lock variable status further includes a fourth status for indicating that said cache memory associated with the lock control apparatus has not acquired said lock and that one of said other cache memories of said plurality of cache memories has acquired said lock.

16. A method of controlling a lock in a shared-memory multi-processor system comprising a plurality of memory banks, said method comprising steps of:

acquiring a lock with respect to a memory bank of said plurality of memory banks;

setting a lock acquisition status with respect to other memory banks of said plurality of memory banks, such that a data in said memory bank is not accessible by processors of said multi-processor system other than a processor accessing said data in said memory bank at a time said memory bank acquires the lock;

accessing a shared area of said memory bank; and releasing the acquired lock, wherein said lock has one of a plurality of statuses, said plurality of statuses including:

a first status for indicating that a processor has acquired said lock and that other processors of a plurality of processors have not acquired said lock; and a second status for indicating that said processor has not acquired said lock and that it is uncertain whether the other processors have acquired the lock.

17. The method of controlling the lock as claimed in claim 16, said plurality of statuses further including:

a third status for indicating that none of said plurality of processors has acquired the lock; and a fourth status for indicating that said processor has not acquired the lock and that one of others of said plurality of processors has acquired the lock, wherein in said lock acquiring step, the third status is set to the first status without checking a status in another processor when the processor issues a lock request.

18. The method of controlling the lock as claimed in claim 17, wherein in said lock acquiring step, the second status is set to the fourth status when the processor issues said lock request, and the lock acquisition request fails without checking a status in said another processors when the processor issues a next lock request.

* * * * *